United States Patent
Haimer et al.

(10) Patent No.: US 10,837,760 B2
(45) Date of Patent: Nov. 17, 2020

(54) DEVICE FOR ADJUSTING THE SETTING OF AND/OR FOR MEASURING A TOOL

(71) Applicant: Haimer GmbH, Igenhausen (DE)

(72) Inventors: Franz Haimer, Igenhausen (DE); Franz-Josef Haimer, Igenhausen (DE)

(73) Assignee: Haimer GmbH, Igenhausen (DE)

( * ) Notice: Subject to any disclaimer, the term of this patent is extended or adjusted under 35 U.S.C. 154(b) by 0 days.

(21) Appl. No.: 16/295,279

(22) Filed: Mar. 7, 2019

(65) Prior Publication Data
US 2019/0277626 A1    Sep. 12, 2019

(30) Foreign Application Priority Data
Mar. 9, 2018 (DE) .................. 10 2018 105 515

(51) Int. Cl.
| G01B 11/14 | (2006.01) |
| G01B 21/04 | (2006.01) |
| G01B 5/20 | (2006.01) |
| B23Q 17/09 | (2006.01) |
| G01B 11/24 | (2006.01) |

(52) U.S. Cl.
CPC .......... G01B 11/14 (2013.01); B23Q 17/0919 (2013.01); G01B 5/20 (2013.01); G01B 11/2433 (2013.01); G01B 21/042 (2013.01); G01B 21/047 (2013.01)

(58) Field of Classification Search
CPC ...... G01B 11/14; G01B 5/20; G01B 11/2433; G01B 21/042; G01B 21/047; B23Q 17/0919
USPC ........................................................ 356/614
See application file for complete search history.

(56) References Cited

U.S. PATENT DOCUMENTS

| 2011/0256806 A1* | 10/2011 | Monnoyeur | ........ B24B 13/0031 451/10 |
| 2013/0050712 A1* | 2/2013 | Samukawa | ............ G01B 11/24 356/612 |
| 2014/0236520 A1* | 8/2014 | Engel | ................... G01B 21/042 702/95 |
| 2015/0285616 A1* | 10/2015 | Jordil | ........................ G06T 7/73 348/135 |
| 2015/0297311 A1* | 10/2015 | Tesar | ..................... A61B 6/032 600/411 |
| 2015/0345937 A1* | 12/2015 | Seitz | .................... G01B 21/042 250/231.13 |
| 2016/0195389 A1* | 7/2016 | Sagemueller | ........ G01B 21/045 33/503 |
| 2016/0223316 A1* | 8/2016 | Jordil | ................... G01B 11/005 |

FOREIGN PATENT DOCUMENTS

DE          102013218411 A1    3/2015

\* cited by examiner

Primary Examiner — Roy M Punnoose
(74) Attorney, Agent, or Firm — Paul D. Bianco; Gary S. Winer; Fleit Intellectual Property Law

(57) ABSTRACT

A device for adjusting the setting of and/or for measuring a tool includes a measuring element carrier which can move along a first axis (x-axis), and along a second axis (z-axis) that extends at right angles to the first axis, on which measuring element carrier a measuring element for the optical measurement of the tool is disposed. To facilitate the adjusting and measuring process, a reference body, which is able to move between a standby position and a measuring position on the tool, is disposed on the measuring element carrier for interaction with the measuring element.

14 Claims, 4 Drawing Sheets

DEVICE FOR ADJUSTING THE SETTING OF AND/OR FOR MEASURING A TOOL

FIELD OF THE INVENTION

The present invention relates to a device for adjusting the setting of and/or for measuring a tool.

BACKGROUND

Devices of this type are used, e.g., for presetting a tool. As a rule, such devices comprise an optical measurement system which makes it possible to detect the position of the blades or cutting faces of a tool that is clamped into a tool holder. The position of the blades can subsequently be transmitted to a control unit of a machine tool for machining.

DE 10 2013 218 411 A1 discloses a generic device for adjusting the setting of and/or for measuring a tool. This device comprises a measuring element carrier which can be moved along two axes disposed at right angles to one another and on which a measuring means for the optical measurement of the tool is disposed. A light source is disposed on one leg of the substantially U-shaped measuring element carrier and a camera or another suitable light absorber is disposed on the opposite leg. By means of such a device, tools having a clearly defined blade or cutting edge can be very precisely measured and preset. In most cases, the measurement is performed with the aid of software, on a monitor which is associated with the device for adjusting the setting of and/or for measuring. However, when tools having a plane cutting face, e.g., grinding wheels, are to be measured, a potential problem may arise in that the cutting face does not have a clearly defined reference edge within the region of focus of the optical measurement system. There is no distinct reference edge relative to which the optical measurement system can be oriented or focused. This is true both for instruments on which the optical measurement system is manually oriented by an operator and to instruments which are automated and work with an image processing device. Thus, the result is a measurement inaccuracy of up to several 1/100 mm.

SUMMARY

One aspect of the disclosure relates to a device for adjusting the setting of and/or for measuring a tool of the type mentioned above, which allows even differently configured tools to be measured. Ideally, the measurement inaccuracy is reduced to less than 1/00 mm.

Advantageous practical embodiments and further advanced modifications are also disclosed.

The device for adjusting the setting of and/or for measuring a tool as disclosed comprises a measuring element carrier that is able to move along a plurality of axes, in which measuring element carrier a measuring means for the optical measurement of the tool is disposed. In addition, a reference body is dedicated to the measuring element carrier, which is able to move between a standby position and a measuring position on the tool, and which is provided for interaction with the measuring means. The reference body, which can be moved into a measuring position on the tool, gives a clearly defined and distinct edge to a light beam, which can be precisely focused by an optical device, and which can also be used, e.g., to determine an exact position. In this manner, an optical measurement system can be precisely oriented to and focused on the reference body. In contrast to undefined surfaces, the reference body can be clearly detected by the optical system and thereby make the measuring process significantly easier.

In an especially advantageous modification, the reference body can be movably disposed on the measuring element carrier. Thus, by moving the measuring element carrier, the reference body can, e.g., be laid alongside a surface that is to be measured. However, the reference body could also be disposed on another movable part of the device for adjusting the setting of and/or for measuring a tool.

In one possible practical implementation, the reference body can be disposed, e.g., on a free end of a pivotable arm. The arm can be pivotably disposed on the measuring element carrier which moves along a plurality of axes. However, the reference body can also be disposed on the measuring element carrier so as to move between a retracted standby position and an extended measuring position.

In a robust implementation of the invention, the reference body can be firmly disposed on the pivotable or movable arm. For easier alignment to differently oriented surfaces, the reference body can also be hinge-mounted to the arm.

In an especially advantageous modification, the reference body can be held eccentrically on the arm and be moved by means of a gripping member.

The arm can be pivotably mounted on the measuring element carrier by means of a holding device. The holding device can be adjusted by means of an adjustment device. In addition, the arm can preferably also comprise a spring mechanism which preferably interacts with a gripping member disposed on the arm.

To improve user friendliness, a display device can be provided, which signals that contact between the reference body and the tool has been established. Thus, using a light-emitting diode or other display element, it is, e.g., possible to signal that the reference body has made contact with the tool. Such a display device is also useful when an automated measurement is made and the reference body is being automatically moved toward the tool. In an automated modification, it is also possible for a signal to be output in digital form between the measuring instrument and the output instrument.

BRIEF DESCRIPTION OF THE DRAWINGS

Additional characteristic features and advantages of the invention follow from the description based on a preferred practical example below, with reference to the drawing. The figures show.

DETAILED DESCRIPTION

Figure 1:
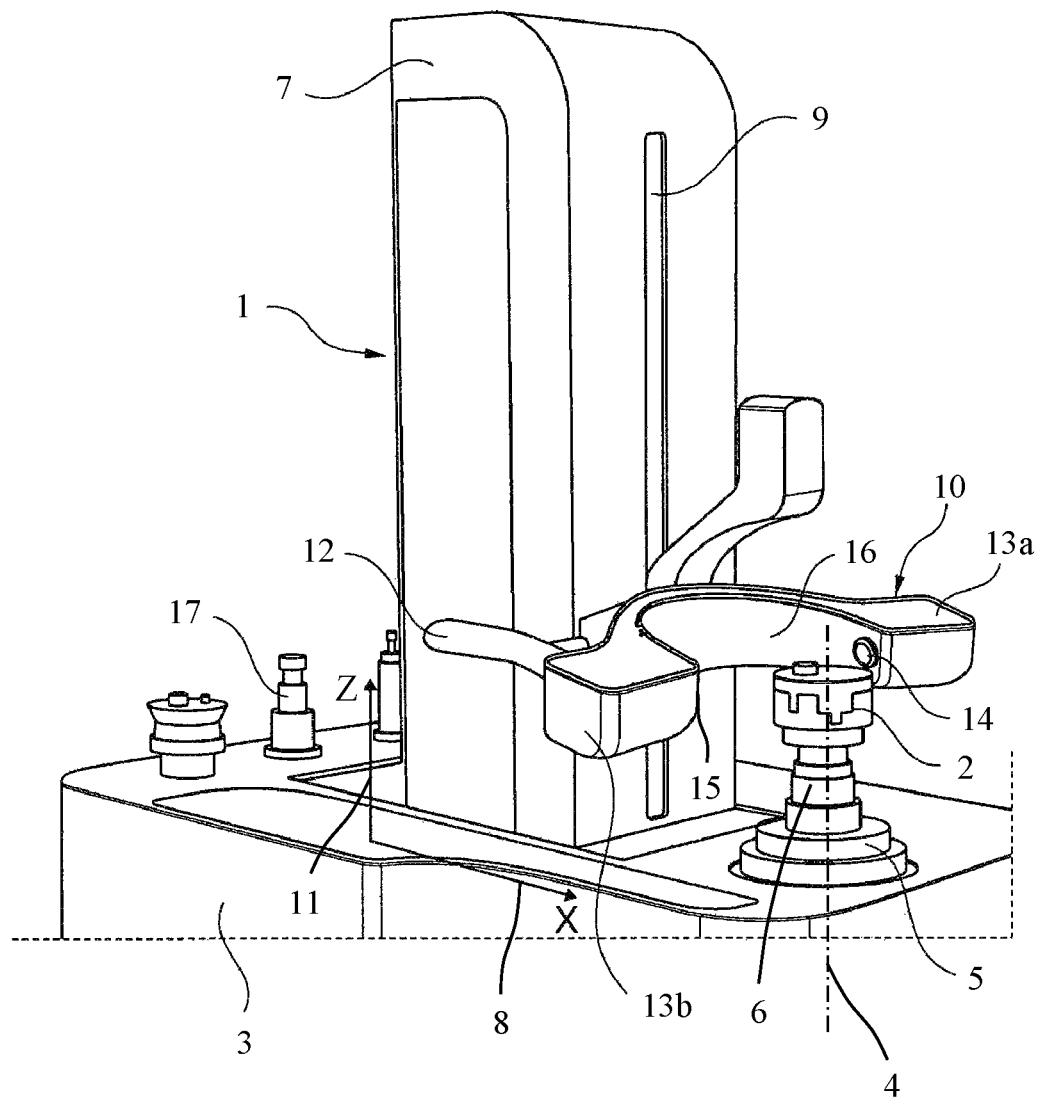
FIG. 1 a schematic representation of a device for adjusting the setting of and/or for measuring from one perspective.

The device 1 for adjusting the setting of and/or for measuring a tool 2, which is shown schematically in FIG. 1, comprises a base or bottom section 3 on which a receiving member 5 for holding the tool 2 is disposed, which receiving member pivots about a center axis 4. In the practical example shown, the tool holder 6 with the tool 2 is inserted into the receiving member 5. The receiving member 5 is disposed in such a way that the center axis 4 of the receiving member 5 and thus also the center axis of the tool holder 6 is oriented perpendicularly.

On the base or bottom section 3, a vertical stand 7 is movably guided along a first axis 8 (x-axis) perpendicular to the center axis 4 of the receiving member 5. Along a guideway 9 of the stand 7, which moves along the first axis 8 (x-axis), a measuring element carrier 10 is movably disposed along a second axis 11 (z-axis), which extends at right angles to the first axis 8. Thus, the measuring element carrier 10 can be moved vertically along an axis (z-axis) that extends parallel to the center axis 4 of the receiving member 5 and horizontally along a further axis (x-axis) at right angles thereto. The stand 7 on the base or bottom section 3 and the measuring element carrier 10 on the stand 7 can be moved in a way known in the art by means of motors, via spindles or other suitable drive mechanisms. However, the stand 7 and the measuring element carrier 10 can also be moved manually by means of a handle grip 12.

The measuring element carrier 10, which can move horizontally and vertically along the two axes 8 and 11, is configured in a substantially bracket-like or U-shaped form and comprises two arms 13a and 13b which envelop the tool 2 and which lie in a plane that extends at right angles to the center axis 4 of the receiving member 5. A measuring means having a first measuring element 14 and an opposing second measuring element 15 is disposed on the measuring element carrier 10. In the embodiment shown, a first measuring element 14 in the form of a light source is disposed on the inside of the arm 13a, and a second measuring element 15 in the form of a light receiver situated opposite the light source is disposed on the inside of the other arm 13b. A measuring beam can subsequently be passed from the first measuring element 14 in the form of a light source on one arm 13a to the second measuring element 15 in the form of a light receiver on the other arm 13b.

The measuring element carrier 10, as seen in the top view, has a U-shaped free space 16 between the two arms 13a and 13b, for receiving the tool 2. The measuring element 14 in the form of a light source and the second measuring element 15 in the form of a light receiver are arranged in such a way that the measuring beam extends within the free space 16 between the two free ends of the arms 13a and 13b of the measuring element carrier 10. Thus, this allows the measuring beam traveling from the first measuring element 14 to the second measuring element 15 to be guided across a larger surface of a tool. The second measuring element 15, which serves to receive the measuring beam, can also be a camera capable of taking photos of the tool and transmitting them to a control unit and/or a computer for evaluation. Furthermore, a tool reservoir 17 can also be disposed on the base or bottom section 3.

Figure 2:
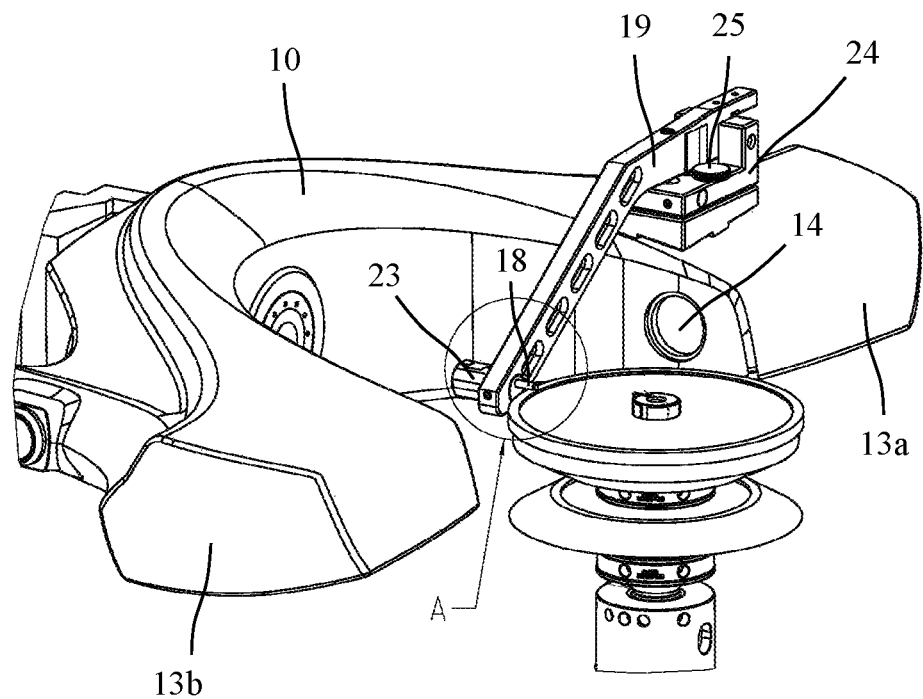
FIG. 2 a detail view of a measuring element carrier with a reference body in a measuring position.
Figure 3:
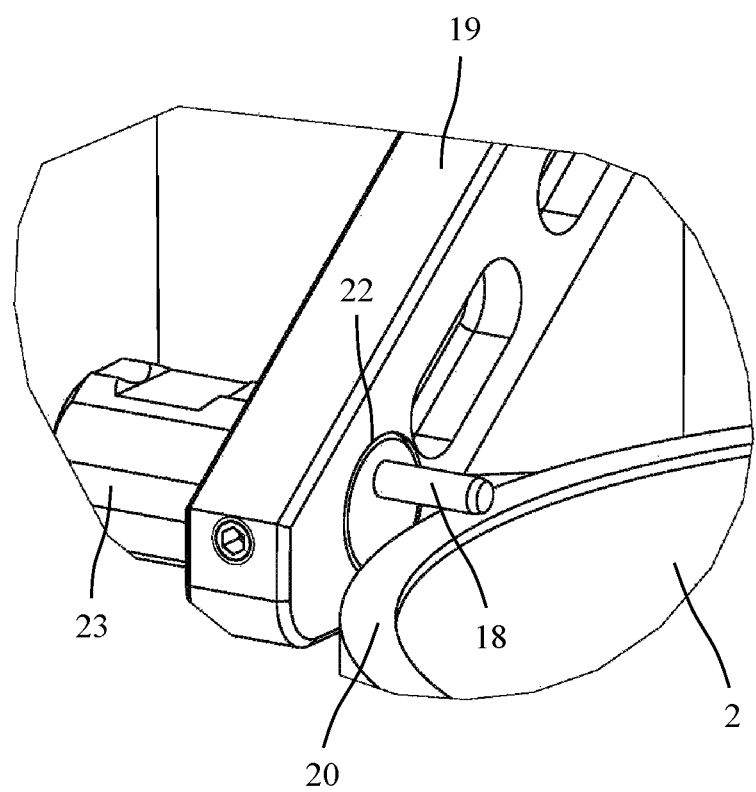
FIG. 3 a detail view of an arm disposed on the measuring element carrier with a reference body.
Figure 4:
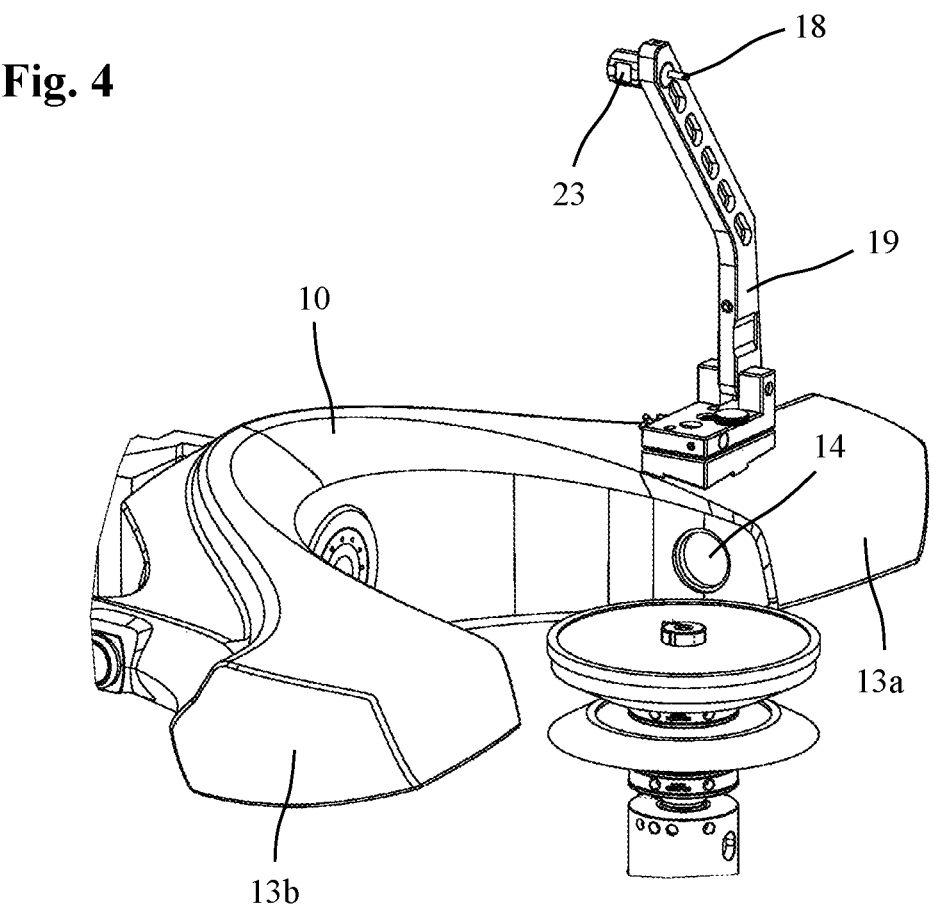
FIG. 4 a detail view of a measuring element carrier with a reference body in an upwardly folded standby position.
Figure 5:
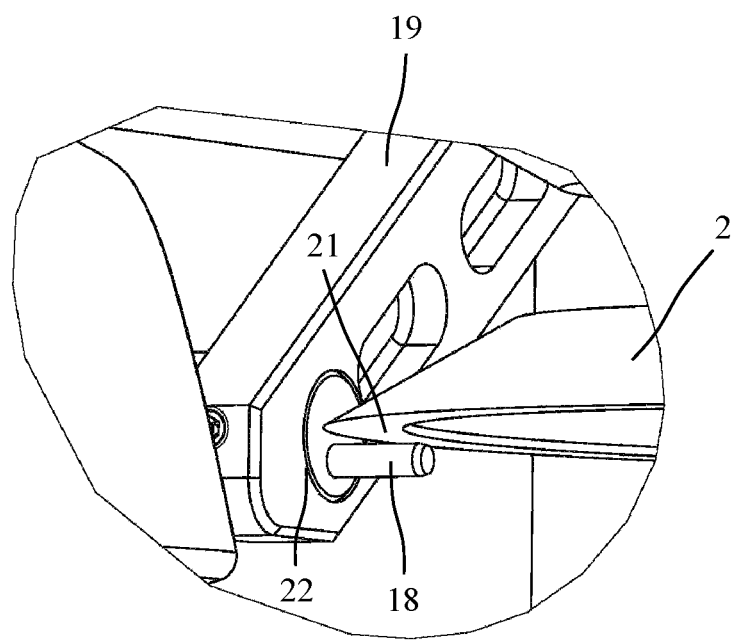
FIG. 5 a detail view of a measuring element carrier with a reference body in a different measuring position, and FIG. 6 a sectional view of a holding device.

A reference body 18 interacting with the measuring means can be disposed on the measuring element carrier 10 so as to move between a standby position, as shown in FIG. 4, and a measuring position, as shown in FIG. 2. In the embodiment shown, the reference body 18 is designed in the form of a cylindrical pin having a diameter of less than 10 mm. The pin-shaped reference body 18 is disposed on the free end of an arm 19 that is pivotably hinge-mounted to the measuring element carrier 10. This allows the reference body 18 to be moved between an upwardly folded standby position and a downwardly folded measuring position. However, the arm 19 could also be folded or moved to the side. In the embodiment shown, the arm 19 is designed in such a way that the reference body 18 shown in FIG. 3 can be placed not only onto an upper surface 20 of the tool 2, but, as shown in FIG. 5, can also be made to adjoin a lower surface 21 of the tool 2 from below. In a preferred practical example, the arm 19 is retained in the upper standby position by means of a retaining mechanism, for example, a stop mechanism or a magnet.

The length of the arm 19 is dimensioned such that the center axis of the reference body 18 in the downwardly folded position intersects with the center axis 4 of the tool 2.

The reference body 18 is preferably mounted on the arm 19 in such a way that it can be moved with relatively little effort between an upper and a lower stop position. This is most easily implemented by attaching the reference body 18 eccentrically in a receiving aperture 22 of the arm 19. By turning a gripping member 23, which projects from the side of the arm 19 facing away from the tool, it is possible to switch back and forth between the two stop positions. Ideally, the axis of rotation of the gripping member 23 is configured to extend along a lateral surface line of the reference body 18. This ensures that during downward and upward probing, the arm 19 always remains in the same deflected position. As an alternative, the reference body 18 can also be moved by means of a linear guide mechanism or a swivel mechanism or the like.

As indicated in FIG. 2, on its side facing away from reference body 18, the arm 19 is mounted on a holding device 24, which allows a fine adjustment to be made separately from the measuring element carrier 10. The fine adjustment serves to orient the center axis of the reference body 20 parallel to the second axis 11. To this end, the holding device 24 has an adjusting means 25 designed, e.g., in the form of a setting wheel. By turning the setting wheel, the upper portion of the holding device 24 can be pivoted to the lower portion of the holding device 24 about an axis which extends substantially perpendicular to both the first axis 8 and the second axis 11.

Figure 6:
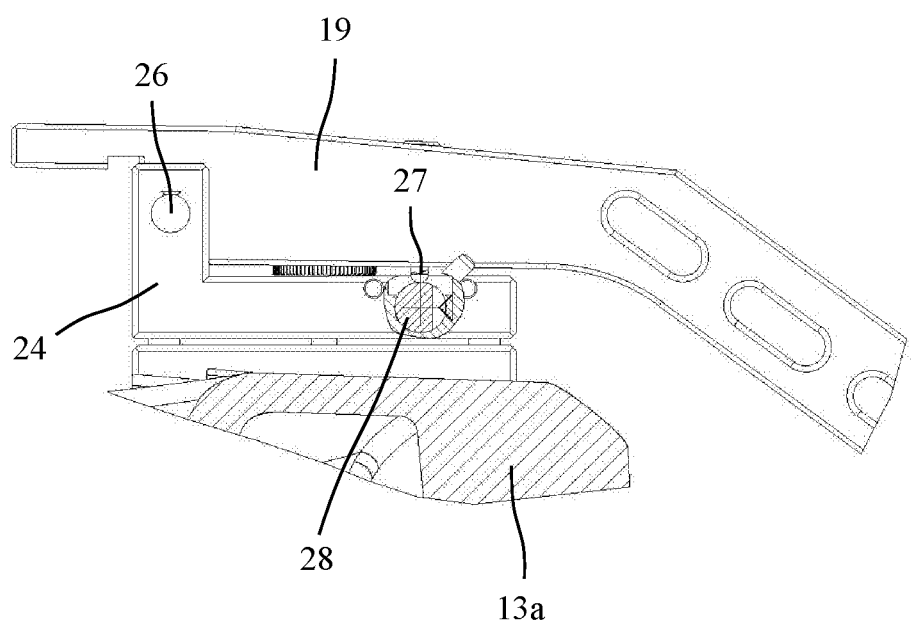

In addition, the arm 19, which is disposed on the holding device 24 so as to pivot about an axis 26, can comprise a spring mechanism 27, as shown in FIG. 6, which interacts with a setting device 28 that is mounted inside the holding device 24. In one possible practical implementation, the setting device 28 is designed in the form of a lever having a pin that extends at right angles to the axis of rotation. The outer circumference of the pin is not completely cylindrical but has a flattened face on one side. In a first position, the lever is set so that the cylindrical face of the pin points upwardly. This causes the spring mechanism 27 to lie on top of the pin. This has the effect that the arm 19 is spring-preloaded against forces which act downwardly parallel to the axis of rotation. This is useful especially when the reference body 18 is moved from below toward the object to be measured and thus does not come to rest against said object because of its own weight. In a second position. The lever is set so that the flat side points in the direction of the spring mechanism 27. The spring mechanism 27 is dimensioned to ensure that it does not come to rest against this side of the pin.

In an alternative implementation of the invention, the arm 19 can be spring-loaded both downwardly and upwardly so that the arm 19 and thus also the reference body 18 are always preloaded to a certain extent when the reference body 18 lies on top of the surface of the tool 2. This ensures that the reference body 18 is always resting against the surface of the tool 2.

It goes without saying that the position of the arm 19 and that of the holding device 24 is not limited to the areas shown in the figures, but that the arm 19 and the holding device 24 can be mounted to different areas of the measuring element carrier 10. For example, they can also be mounted to areas of the measuring element carrier 10 which bound the free space 16, especially in the center of the U-shaped area between the enveloping arms 13a and 13b.

LIST OF REFERENCE CHARACTERS

1 Device for adjusting the setting of and/or for measuring
2 Tool
3 Base or bottom section
4 Center axis
5 Receiving member
6 Tool holder
7 Stand
8 First axis
9 Guideway
10 Measuring element carrier
11 Second axis
12 Handle grip
13a First arm
13b Second arm
14 First measuring element
15 Second measuring element
16 Free space
17 Tool reservoir
18 Reference body
19 Arm
20 Upper surface
21 Lower surface
22 Receiving member aperture
23 Gripping member
24 Holding device
25 Adjusting means
26 Axis
27 Spring mechanism
28 Setting device

The invention claimed is:

1. A device for adjusting the setting of and/or for measuring a tool, the device comprising:
 a measuring element carrier moveable along a first axis and along a second axis that extends at right angles to the first axis;
 a measuring element disposed on the measuring element carrier for optical measurement of the tool; and
 a reference body disposed on the measuring element carrier and moveable between a standby position and a measuring position on the tool, for interaction with the measuring element.

2. The device of claim 1, wherein the reference body is movably disposed on the measuring element carrier.

3. The device of claim 1, wherein the reference body is disposed on a free end of a movable arm.

4. The device of claim 3, wherein the arm is pivotably hinge-mounted to the measuring element carrier.

5. The device of claim 3, wherein the arm is pivotably disposed on the measuring element carrier by a holding device.

6. The device of claim 5, wherein the holding device is adjustable by an adjusting means.

7. The device of claim 3, wherein the arm comprises a spring mechanism.

8. The device of claim 7, wherein the spring mechanism interacts with a setting device disposed on the arm.

9. The device of claim 3, wherein the reference body is mounted eccentrically on the arm.

10. The device of claim 9, wherein the reference body is disposed on the arm so as to be adjustable by a gripping member.

11. The device of claim 1, wherein the measuring element comprises a first component and a second component.

12. The device of claim 11, wherein the measuring element carrier comprises a first arm and a second arm and wherein the first component of the measuring element is disposed on the first arm and the second component of the measuring element is disposed on the second arm.

13. The device of claim 12, wherein the first component is a light source and the second component is a light receiver.

14. The device of claim 11, wherein the first component is a light source and the second component is a light receiver.

* * * * *